United States Patent [19]

Margolin

[11] Patent Number: 4,765,707

[45] Date of Patent: Aug. 23, 1988

[54] METHOD OF TERMINATING FIBER OPTIC CONNECTOR WITHOUT POLISHING OPTICAL FIBER

[75] Inventor: Mark Margolin, Lincolnwood, Ill.

[73] Assignee: Amphenol Corporation, Wallingford, Conn.

[21] Appl. No.: 932,134

[22] Filed: Nov. 18, 1986

Related U.S. Application Data

[63] Continuation of Ser. No. 474,099, Mar. 10, 1983, Pat. No. 4,643,520.

[51] Int. Cl.$^4$ .............................................. G02B 6/36
[52] U.S. Cl. ............................. 350/96.20; 350/96.10
[58] Field of Search ............... 350/96.20, 96.21, 96.22

[56] References Cited

U.S. PATENT DOCUMENTS 4,643,520  2/1987  Margolin ..................... 350/96.21 X Primary Examiner—William L. Sikes
Assistant Examiner—Akm E. Ullah
Attorney, Agent, or Firm—Bacon & Thomas

[57] ABSTRACT

A method of terminating the fiber core of a fiber optic cable relative to the mating end of a fiber optic connector. The connector includes a through hole for receiving the fiber optic cable with a length of the core, stripped of its outer coating, protruding from the through hole at the mating end of the connector. The method includes the steps of clamping the fiber optic cable within the connector against lengthwise movement of the cable, cleaving the length of the core flush with the mating end of the connector, and applying a separation force lengthwise of the core during the cleaving thereof. A flat, smooth end surface results and thereby eliminates subsequent polishing or other preparation of the core end.

11 Claims, 1 Drawing Sheet

METHOD OF TERMINATING FIBER OPTIC CONNECTOR WITHOUT POLISHING OPTICAL FIBER

This application is a continuation of application Ser. No. 474,099, filed Mar. 10, 1983, now allowed, U.S. Pat. No. 4,643,520.

BACKGROUND OF THE INVENTION

This invention relates generally to fiber optic connectors and, more particularly, to a method of terminating the inner fiber core of a fiber optic cable relative to the mating end of a fiber optic connector.

It is generally known in the industry that an optical "fiber" conventionally includes a core surrounded by a cladding, both of which normally are of glass but with different indexes of refraction. However, in the specification and claims herein the terms "core" or "fiber core" will be used to denote this composite element of the fiber optic cable.

The terminal end surface of an inner fiber core for use in lightwave transmission must be flat and, normally, polished to minimize insertion losses. The inner fiber core typically must also be axially, laterally, and angularly aligned within certain parameters to establish an excellent optical coupling between two fiber optic cables. The success achieved in the development and production of fiber optic cables therefore has focused strongly upon low loss connectors and couplers for such cables, including in-line connectors. The ability to design, manufacture, deploy and service a data transmission line, for instance, requires suitable connectors in order to assure the continued progress of the fiber optics field. Accordingly, connectors for this and other applications are being developed which can be used without any significant increase in insertion losses.

Many fiber optic connectors presently available are precision, expensive instruments providing very low insertion losses, but they are designed for certain applications such as long distance applications in telephonic systems and in other applications requiring extremely low insertion losses where expensive low loss connectors may be employed. It has been found, however, that expensive low loss connectors are not always well suited for applications requiring a large number of connectors where very expensive connectors are not economically feasible. For instance, in such applications as computers and other data transmission applications, a large number of fiber optic cables are employed and there is a continuing need for low cost, low loss fiber optic connectors which minimize insertion losses due to fiber end surface preparation.

Heretofore, low cost, low loss fiber optic connectors have been manufactured by providing a connector portion for receiving the fiber optic cable with a length of the inner fiber core, stripped of its outer coating, protruding from a mating end of the connector. The stripped core then is cleaved or cut off outside the connector and subsequently polished flush with the mating end of the connector. Alternatively, the stripped fiber core has been cleaved to a predetermined length and then placed in the connector with the core end protruding slightly beyond the mating end of the connector. The slight protrusion then is polished flush with the mating end of the connector. All of these prior methods of terminating the inner fiber core relative to the mating end of the connector require a separate polishing step to provide a flat, smooth end surface of the core to minimize insertion losses.

The present invention is directed to a new method of terminating the inner fiber core relative to the mating end of the connector, in which subsequent polishing or other preparation of the core end is completely eliminated.

SUMMARY OF THE INVENTION

In accordance with the invention, the method contemplates terminating the inner core of a fiber optic cable relative to the mating end of a fiber optic connector. The cable has an outer coating about the inner fiber core. The method includes the steps of providing a fiber optic connector for receiving the fiber optic cable with a length of the core, stripped of its outer coating, protruding from the mating end of the connector. The length of the stripped core is cleaved flush with the mating end of the connector in a manner to eliminate subsequent polishing or other preparation of the core end.

Preferably, the connector has a through hole, with the core protruding from the through hole at the mating end of the connector. The fiber optic cable is clamped within the connector against lengthwise movement of the cable. Tension is applied to the length of the core during the cleaving thereof and with the cable clamped within the connector. The tension is applied generally parallel to the length of the core and, when done so during the cleaving step, a smooth flat end surface is presented which eliminates subsequent polishing or other preparation of the core end.

The fiber optic connector preferably clamps an outer coated portion of the fiber optic cable within the connector to preclude any lengthwise movement of the cable during termination of the core relative to the mating end of the connector.

Other features and advantages of the invention will be apparent from the following detailed description taken in connection with the accompanying drawings.

DETAILED DESCRIPTION OF THE INVENTION

Figure 1:
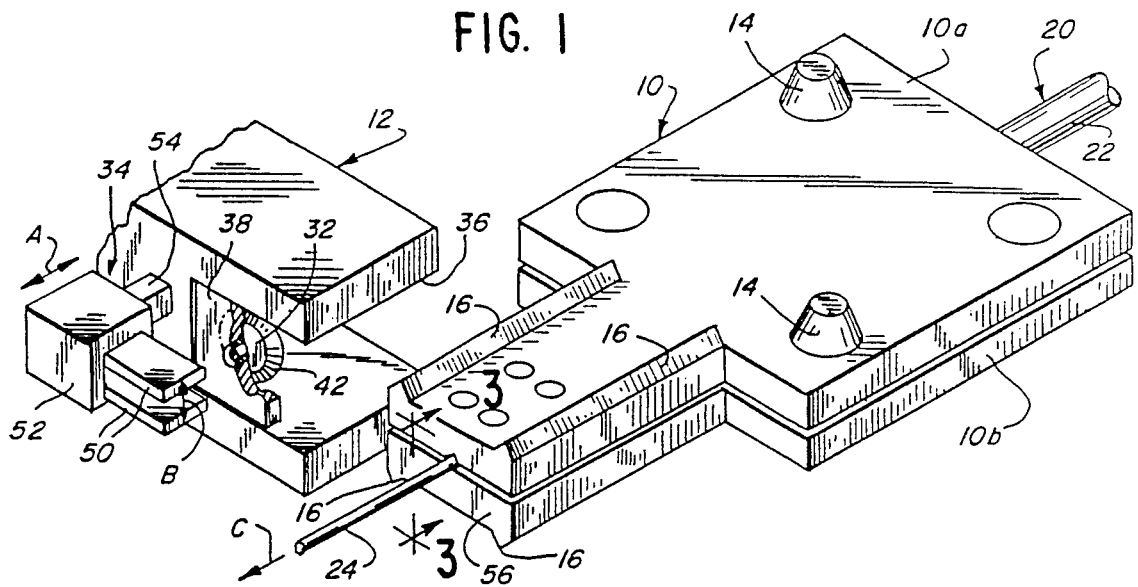
FIG. 1 is a fragmented perspective view of a fiber optic connector and a cleaving tool appropriate for carrying out the method of the present invention.

Referring to the drawings in greater detail, and first to FIG. 1, the method of the present invention is described herein as being carried out by employing an appropriate fiber optic connector, generally designated 10, and an appropriate cleaving tool, generally designated 12. It should be pointed out initially that the particular connector and the particular cleaving tool shown herein are but for illustration purposes and do not form a part of the present invention except to the extent of illustrating the steps of the inventive method.

With the aforesaid understanding, connector 10 is fabricated of two matching, identical halves 10a and 10b which are held together by a plurality of snap-in locking studs 14. A forward portion of connector 10 includes four corner ridges 16 extending lengthwise of the connector. These ridges are adapted for engaging a ferrule or other component, such as an in-line sleeve, as is known in the art.

Figure 3:
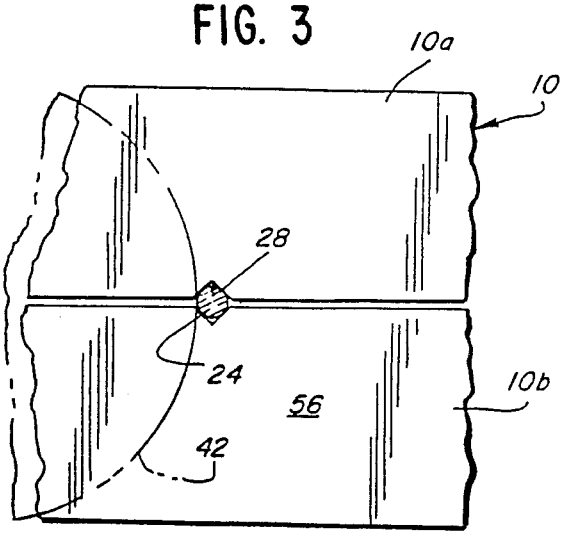
FIG. 3 is a fragmented elevation, on an enlarged scale, illustrating the end of the fiber core and the mating end of the connector.
Figure 4:
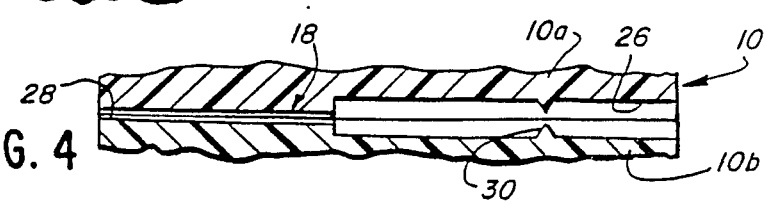
FIG. 4 is a fragmented longitudinal section through the connector illustrating the through hole and the means for clamping the fiber optic cable.

Referring to FIGS. 3 and 4, the mating halves 10a, 10b of connector 10 define a through hole, generally designated 18, for receiving a fiber optic cable, generally designated 20 (FIG. 1). The fiber optic cable includes an outer coating 22 surrounding an inner fiber core 24. Consequently, through hole 18 has an enlarged, rear portion 26 for receiving the outer coating of the cable and a reduced, forward portion 28 for receiving the inner core of the cable. FIG. 3 illustrates that the forward portion 28 of the through hole is formed by V-shaped grooves in the mating connector halves 10a, 10b. These grooves facilitate proper alignment of the fiber core and minimize dB loss.

It is important that the fiber optic cable be clamped against lengthwise movement while performing the method of the present invention. Consequently, referring to FIG. 4, annular ribs 30 are formed on the inside of through hole portion 26 for clamping onto the outer coating 22 cf cable 20. This permits application of a separation force to fiber core 24 during cleaving thereof, as described in greater detail hereinafter.

Cleaving tool 12 has two major components. One is a cleaving blade or disc 32, and the other is a tensioning device, generally designated 34, for applying a separation force to fiber core 24. Tool 12 has a mouth 36 for sliding over the forward end of connector 10, guided by the edges of ribs 16 of the connector. A front partition 38 of the tool is disposed within mouth 36 and rotatably mounts cleaving disc 32.

Figure 2:
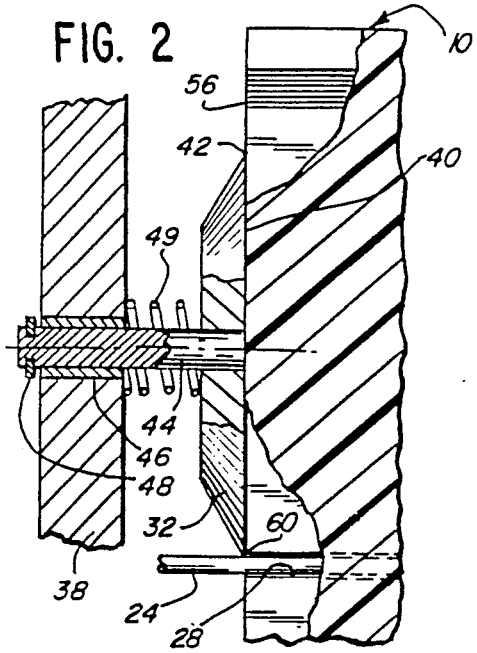
FIG. 2 is a fragmented section through the cleaving blade, on an enlarged scale and taken geneally along line 2—2 of FIG. 1, illustrating the blade in flush engagement with the flat mating end of a connector and about to cleave the fiber core.

Referring to FIG. 2, cleaving disc 32 has a flat, rear surface 40 defining a peripheral cutting edge 42. The disc is mounted onto the rear face of partition 38 by means of a shaft 44 extending through a bushing 46 and held in place by a C-clamp 48. A coil spring 49 surrounds shaft 44 between front partition 38 and cleaving disc 32. It can be seen that the spring biases the disc inwardly toward connector 10.

Tensioning device 34 has a pair of gripper fingers 50 for gripping fiber core 24. The device includes a housing 52 mounted on a rectangular shaft 54 and reciprocally movable with the shaft in the direction of double-headed arrow A (FIG. 1). Gripper fingers 50 are movable toward and away from each other in the direction of double-headed arrow B for gripping fiber core 24. Tensioning device 34, therefore, is adapted for gripping fiber core 24 and pulling on the core in the direction of arrow C to apply a separation force to the core as the core is cleaved by disc 32 and while fiber optic cable 20 is clamped within connector 10 against lengthwise movement.

As stated above, connector 10 and cleaving tool 12 are shown herein for illustration purposes only and a wide variety of other fiber optic connectors and cleaving tools may be derived for carrying out the method of the present invention.

The present invention contemplates a method of terminating the inner core 24 of fiber optic cable 20 relative to a flat mating end 56 of an appropriate fiber optic connector, such as connector 10. The method includes the provision of such a connector for receiving the fiber optic cable with a length of the core, stripped of its outer coating 22, protruding from the mating end of the connector as illustrated in FIG. 1. Preferably, the cable is clamped within the connector against lengthwise movement. As illustrated herein, clamping ridges 30 (FIG. 4) are provided for this purpose to preferably clamp the outer coated portion 22 of fiber optic cable 20.

The length of core 24 protruding from the mating end of the connector then is cleaved flush with the flat mating end 56. Herein, this is accomplished by cleaving disc 32 having smooth face 40 defining peripheral cutting edge 42. During cleaving, a separation force is applied to core 24, preferably generally parallel or lengthwise of the core as indicated by arrow C (FIG. 1). Herein, tensioning device 34 on cleaving tool 12 is provided for this purpose. It should be kept in mind that the clamping pressure applied by clamping ridges 30 must not be too great to cause losses within the connector. Therefore, the separation force applied by tensioning device 34 will be less than the clamping pressure. This all depends on the size and fabriction of the cable and fiber core.

With cable 20 clamped within connector 10, and core 24 tensioned lengthwise thereof, the core can be cleaved flush with the mating end of the connector to effectively present a flat, smooth end surface without any subsequent polishing or other preparation of the core end. The cleaving operation actually comprises a scoring and tensioning procedure which effectively separates the fiber core. The core is not literally cut through by the cleaving disc. In other words, the sharp peripheral edge 42 of cleaving disc 32 scores fiber core 24 at a point 60 flush with the flat mating end 56 of connector 10. As tension is applied to the core during scoring, the core is separated, leaving a flat, smooth end surface perpendicular to the axis of the core and which does not need further polishing.

It can be seen from the foregoing that a complete step, i.e. polishing, of prior art methods is eliminated by the method of the present invention, resulting in a further reduction in the cost of manufacturing such fiber optic connectors. In addition, precise positioning of the cleaved surface is automatically effected because the core is cleaved after positioning the cable within the connector. Therefore, prior positioning steps are eliminated. Connectors manufactured by the method of the present invention can be fabricated in large numbers at relatively low cost without sacrificing the minimization of insertion losses. This is important in such applications as computers and other data transmission applications where a large number of fiber optic cables are employed.

What is claimed is:

1. A method of terminating an inner fiber core of a fiber optic cable relative to a mating end of a fiber optic connector, the cable having an outer coating about said inner fiber core, comprising the steps of:

providing a substantially complete fiber optic connector with a mating end and means for coupling to an appropriate complementary component and means for receiving said fiber optic cable with a length of said core, stripped of said outer coating, protruding from said mating end of said connector;

clamping said fiber optic cable within said connector against lengthwise movement of said cable; and cleaving said length of said inner core in situ within said connector flush with said mating end of said connector by scoring said fiber core at a point flush with the mating end of the connector and applying a separation force to said length of said core along the axis thereof to cause a separation of said core at said scored portion as a result of said tension thereby eliminating subsequent polishing and other preparation and positioning of said core end relative to said connector with said core end flush with said mating end of said connector, and whereby an actual cutting through of the core is not required to effect termination.

2. The method of claim 1, including applying tension to said length of the cable as said separation force during said cleaving step.

3. The method of claim 2, including applying said tension to said length of the cable during said cleaving thereof and with the cable clamped within the connector.

4. The method of claim 3, wherein said tension is applied lengthwise of said length of the cable.

5. The method of claim 1, including stripping the outer coating from at least that portion of the core protruding from the mating end of the connector prior to said cleaving step and prior to clamping withn said connector.

6. The method of claim 5, including applying tension to said length of the core as said separation force during said cleaving step.

7. The method of claim 6, including clamping the fiber optic cable within the connector against lengthwise movement of the cable prior to cleaving.

8. A method of termination an inner fiber core of a fiber optic cable relative to a mating end of a fiber optic connector, said cable having an outer coating about said inner fiber core, comprising the steps of:

provididing a substantially complete fiber optic connector with a mating end and means for coupling to an appropriate complementary component and with a through hole for receiving said fiber optic cable with a length of said core, stripped of said outer coating, protruding from said through hole at said mating end of said connector;

clamping said fiber optic cable within said connector against lengthwise movement of said cable;

scoring said length of said core in situ within said connector at a point flush with said mating end of said connector to cause a separation of said core at said scored portion as a result of said scoring thereby eliminating subsequent polishing and other preparation and positioning of said core end relative to said connector; and applying a separation force to said length of said core along the axis thereof to cause the separation of said core at said scored portion as a result of said tension, thereby forming a core end flush with said mating end of said connector, whereby an actual cutting through of the core is not required to effect termination.

9. The method of claim 8, including applying tension to said length of the core as said separation force during said cleaving thereof and with the cable clamped within the connector.

10. The method of claim 9, wherein said tension is applied lengthwise of said length of the core.

11. The method of claim 10, wherein an outer coated portion of the fiber optic cable is clamped within the connector prior to cleaving.

* * * * *